July 27, 1926.
C. A. WOOLSEY
MILK CRATE
Filed July 28, 1921
1,594,029
3 Sheets-Sheet 1
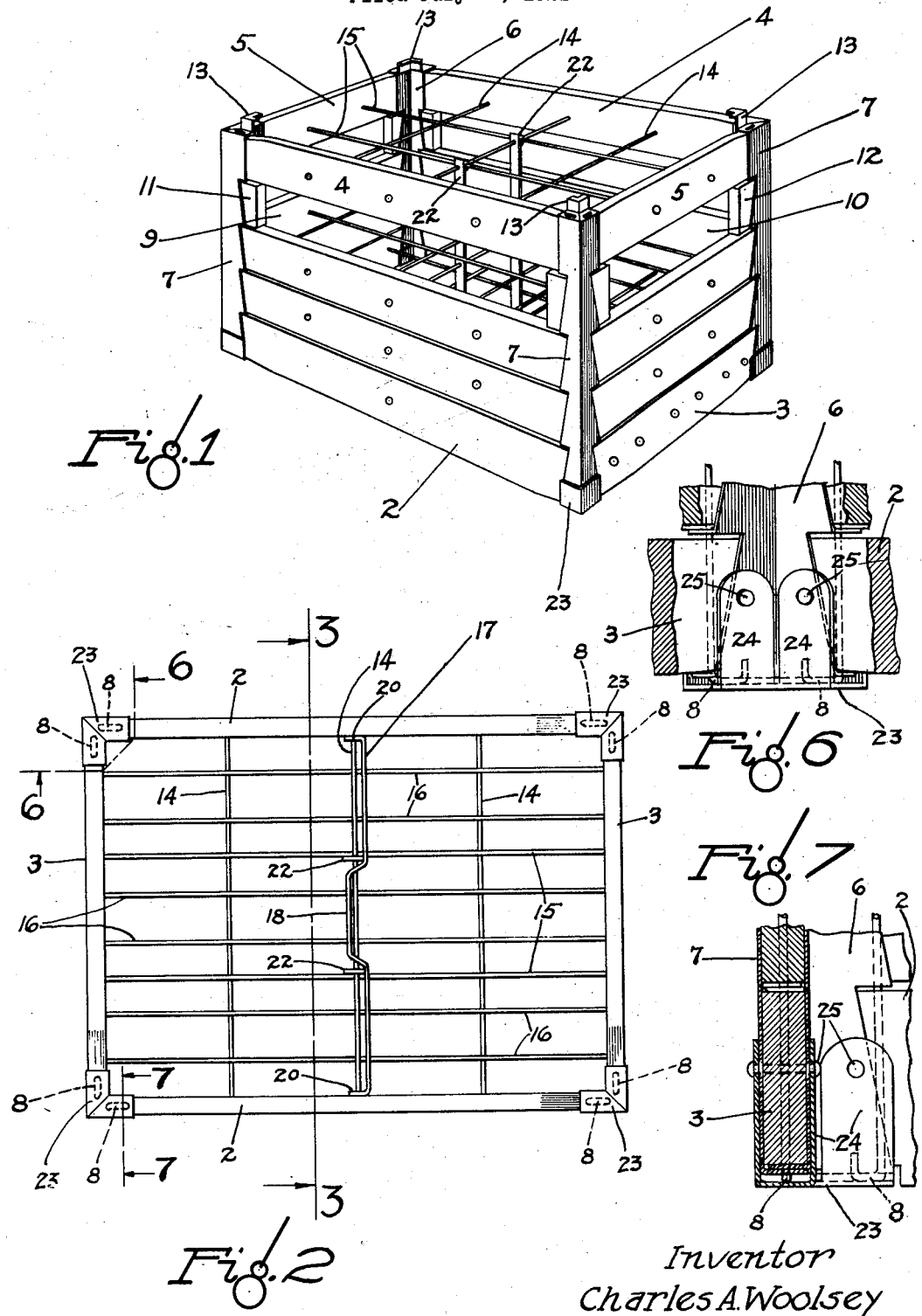
Inventor
Charles A. Woolsey
By Paul Paul
His Attorneys July 27, 1926.

C. A. WOOLSEY

MILK CRATE

Filed July 28, 1921     3 Sheets-Sheet 2

1,594,029

Inventor
Charles A. Woolsey
By Paul Paul
His Attorneys

July 27, 1926.

C. A. WOOLSEY

MILK CRATE

Filed July 28, 1921

Inventor
Charles A. Woolsey
By Paul Paul
His Attorneys

Patented July 27, 1926.

1,594,029

UNITED STATES PATENT OFFICE.

CHARLES A. WOOLSEY, OF MINNEAPOLIS, MINNESOTA.

MILK CRATE.

Application filed July 28, 1921. Serial No. 488,059.

The object of my invention is to provide a crate particularly adapted for transporting milk in bottles. These crates are usually shipped from the creamery to stores, hotels, restaurants, and private families, and as they are subjected to rough, hard usage, it is essential that they be made strong and durable and capable of withstanding crushing strain, as when piled or stacked one upon another. It is customary to pass these crates with the empty bottles, through a washing machine, where the wood and metal is subjected to water, steam and cleaning or chemical compounds which may be provided for cleansing or sterilizing the bottles. It is necessary, therefore, that crates of this kind be so constructed that they will not be injured by exposure to heat or moisture.

A further object is to provide a crate of the character described, so constructed that it can be easily picked up and handled when filled with bottles, or when empty, at the same time having no projections or parts extending outwardly from the walls of the crate which might be easily broken or pulled off.

The invention consists generally in various constructions and combinations, all is hereinafter described and particularly pointed out in the claims.

In the accompanying drawings forming part of this specification,

Figure 1 is a perspective view of a milk crate embodying my invention,

Figure 2 is a bottom view of the crate,

Figure 5:
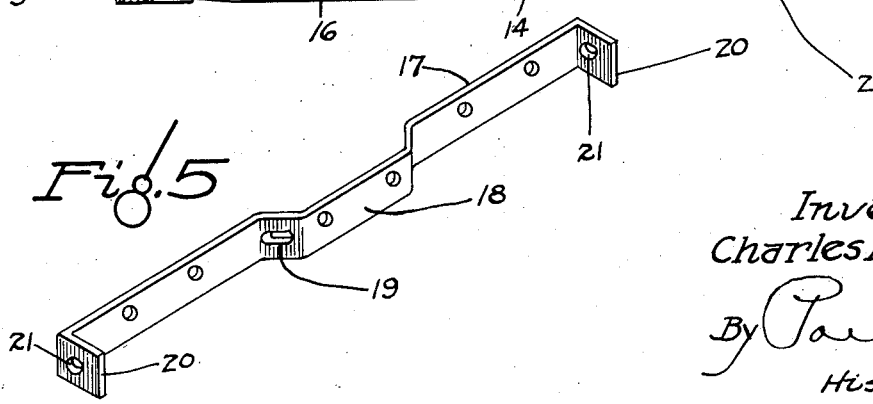
Figures 8, 9:
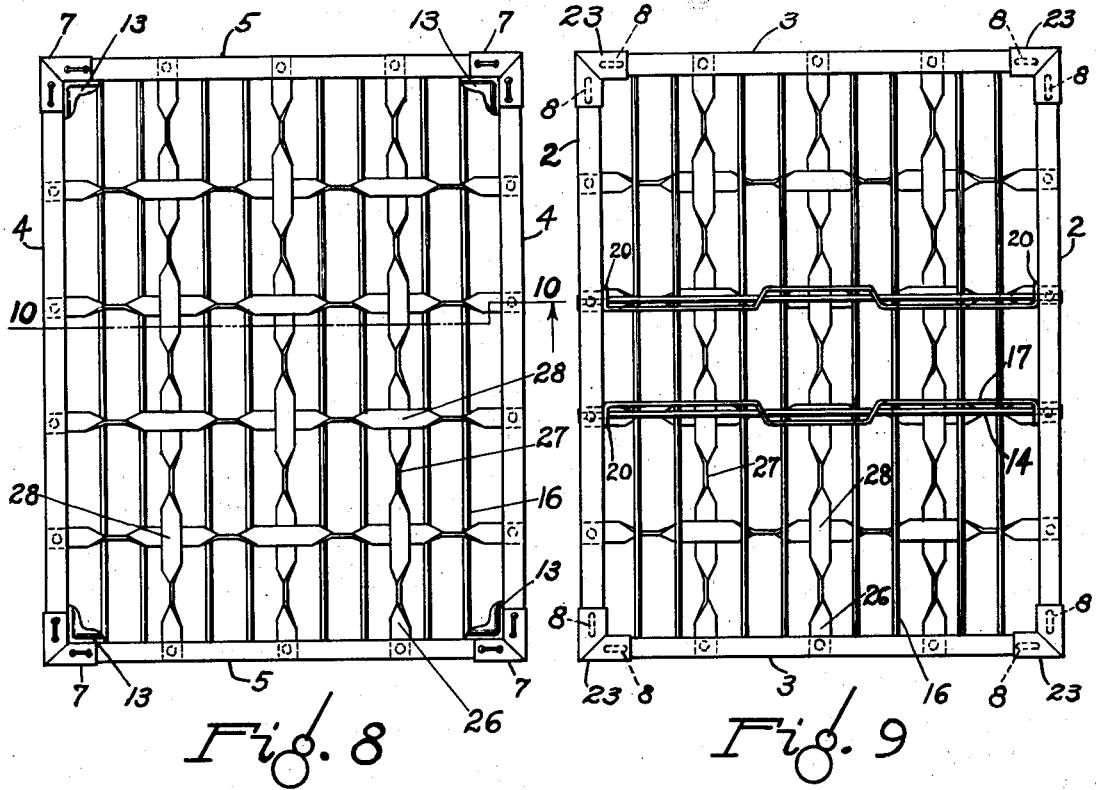
Figures 10, 11, 12, 13:
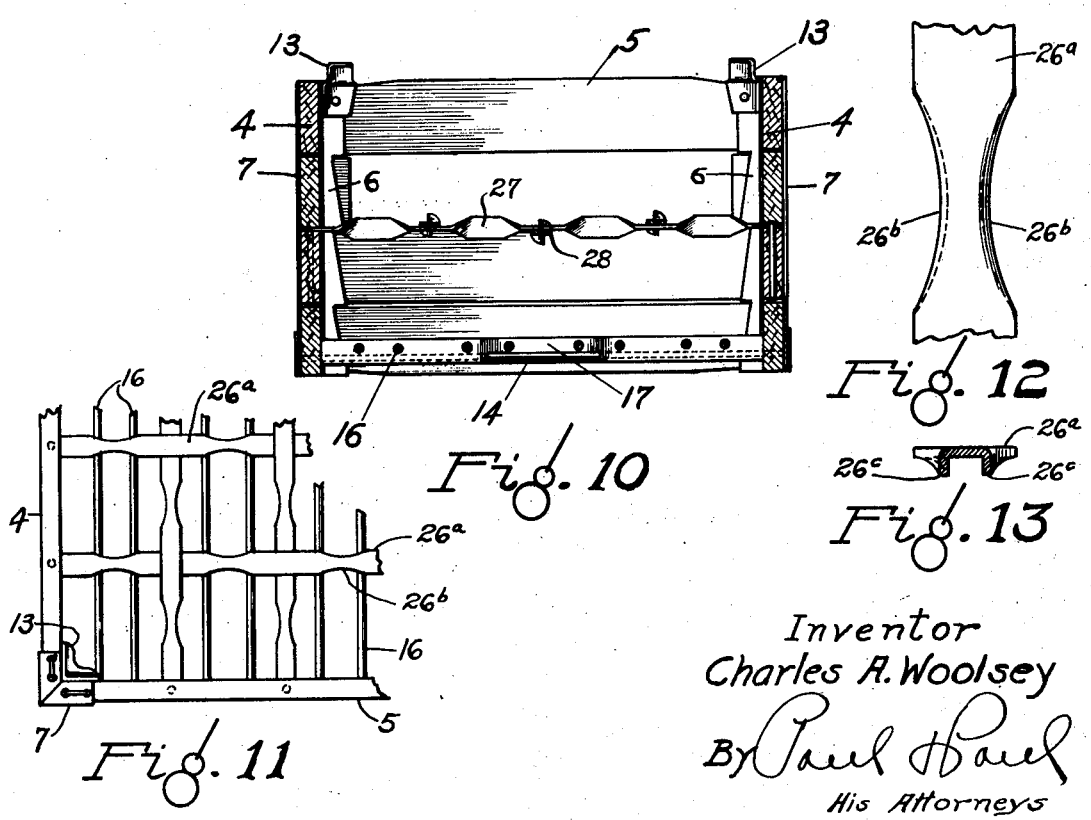

Figure 5 is a perspective view of the truss bar or brace supporting the bottom rails of the crate, Figure 6 is a detail view of one of the corners of the crate, showing the strengthening means therefor, taken on a section line 6—6 of Figure 2, Figure 7 is a detail sectional view through the corner, showing the manner of fastening the reinforcing means thereon, taken on a section line 7—7 of Figure 2, Figure 8 is a top view of a crate of modified construction, Figure 9 is a bottom view, Figure 10 is a section on the line 10—10 of Figure 8, Figure 11 is a detail view, illustrating a modified construction of the separating slats or bars between the walls of the crate, Figure 12 is a detail plan view of a portion of one of the bars, showing the curved seat therein for the wall of the bottle.

Figure 13 is a transverse, sectional view, showing the manner of pressing the edge of the strap downwardly to form the curve therein.

In the drawing, 2 represents the lower side rails of the crate, 3 the lower end rails therefor, and 4 and 5 the upper side and end rails respectively, all joined together at the corners by reinforcing inner and outer angle plates 6 and 7, interlocked with the ends of the rails and secured together and to the rails by lacing wires 8, all as fully illustrated and described in my United States Patent, No. 1,269,242, dated June 11, 1918.

A gap 9 is provided between the lower side rails and the top rail and a similar gap 10 is provided between the lower end rails and the top rail, allowing the convenient insertion of the hands for lifting the crate and moving it from place to place. These gaps are formed by interposing short rail sections 11 and 12 in the side and end wall in place of a long, continuous rail. I am thus able to grasp the side or end top rails at any point around the walls of the box and conveniently lift it and its contents. These gaps, not only form convenient hand-holds for lifting the crate, but when the crates are piled or tiered one upon another, as they frequently are in transportation, the gaps provide ventilating openings through which currents of air may circulate around the filled bottles.

Figure 3:
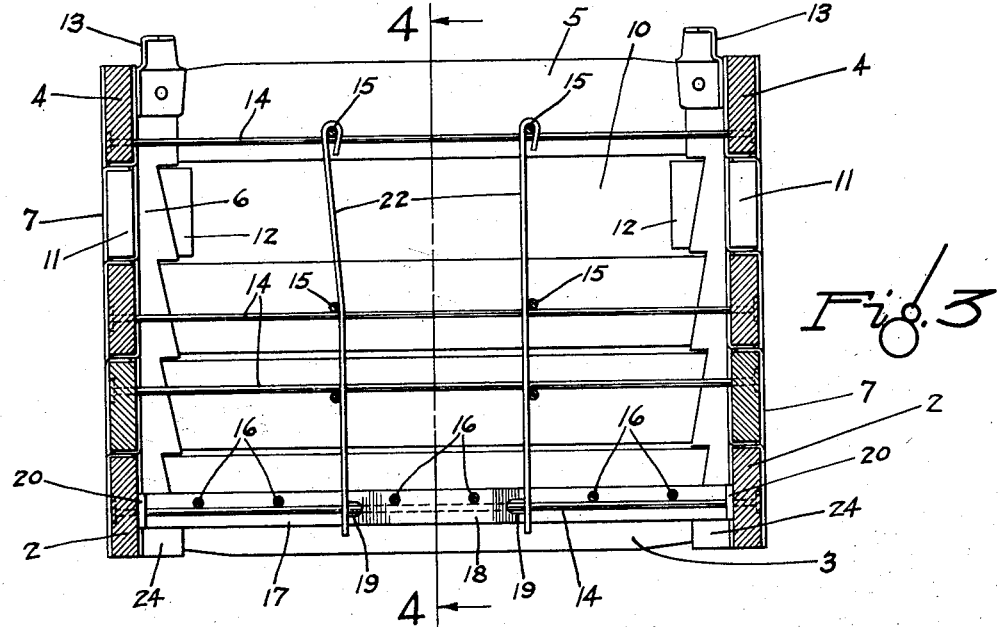
Figure 3 is a sectional view on the line 3—3 of Figure 2.
Figure 4:
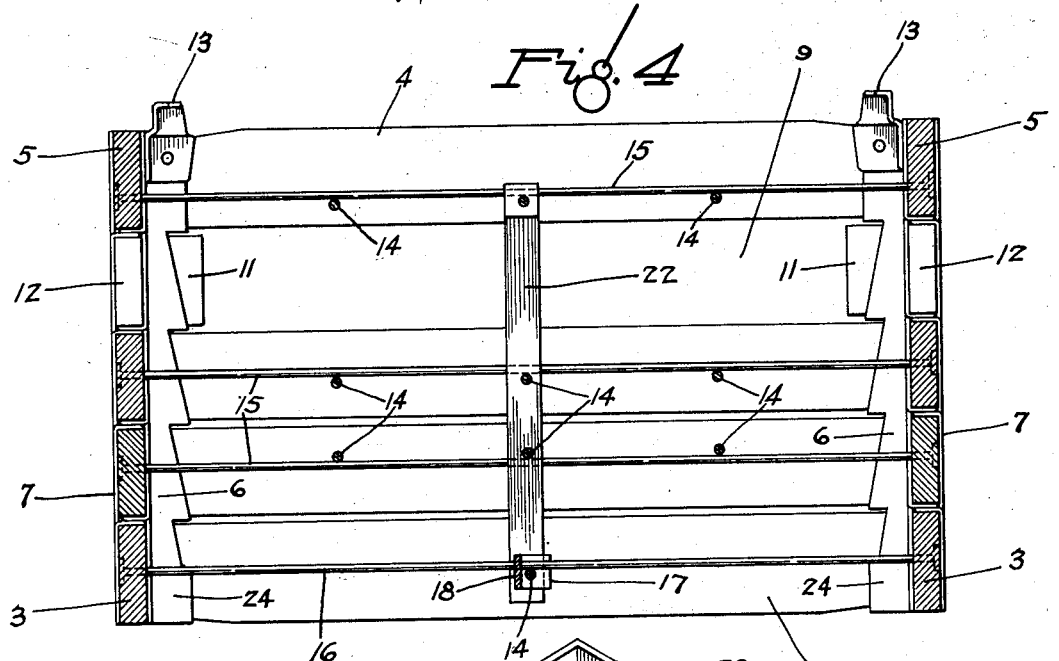
Figure 4 is a sectional view on the line 4—4 of Figure 3.

On each corner at the top I prefer to provide lugs 13 which interlock with the lower walls of the crate above and allow the crates to be conveniently tiered one upon the other to any desired height. The interior of the crate is divided into vertical spaces or compartments by transverse rods 14 and longitudinal rods 15, the intersection of these rods making rectangular openings extending vertically in the crate and adapted to receive the bottles of milk placed therein. The lower end rails have a series of rods 16 therein forming the bottom of the crate and supporting the bottles inserted into the compartments. One of the lower crate rods 14, preferably the middle one, has a transverse truss bar 17 provided with an offset middle portion 18 having holes 19 to receive the rod and angled ends 20, also having holes 21 through which the ends of the rod pass. Holes are also provided in the bar 17 to receive the rods 16, as shown plainly in Figures 3 and 4. The middle rod is also supported by the corresponding rods above by means of hanger bars 22 which have holes therein to receive the cross rods 14, their connection with the lower cross rod being preferably at each end of the offset portion 18 and adjacent thereto. Thus the skeleton partitions dividing the interior of the car are trussed and supported to prevent sagging or settling under the weight of the milk bottles therein.

At each corner of the box at the bottom I provide angle reinforcing plates 23 fitting and protecting the corner on the outside to enable it to withstand the shock and strain when the crate is thrown from place to place in the car. These angle plates on the inner side are provided with ears 24 which are bent inwardly and upwardly on each side of the angle in the crate and are secured thereto by suitable means, such as rivets 25. The corners are thus protected on the inside and outside and at the bottom. This crate may be made in various sizes and may be utilized as a carrier for different articles, though particularly designed for transporting milk or other liquid in bottles.

In Figures 8, 9 and 10, I have shown a crate of slightly modified construction, in which 26 represents flat metal strips which are twisted, as indicated, to present flat upright surfaces 27 to the walls of the bottle. The flat portions 28 of these metal strips intermediate to the surfaces 27 rest horizontally upon the corresponding surfaces of the strips arranged transversely thereto. At the bottom the structure is substantially the same, except that two of the truss bars are preferably provided, instead of one. The longitudinal and cross rods, however, pass through these bars, as shown and described with reference to the bar of Figure 5. In this way the crate is greatly braced and strengthened and able to withstand the rough handling to which devices of this kind are subjected in transit.

In Figure 11 I have shown a modified construction, consisting of straps 26ª having recesses 26ᵇ formed at intervals in their longitudinal edges by pressing flanges 26ᶜ downwardly cut of the edges of said straps. These recesses have curved walls which conform substantially to the curvature of the walls of the bottles. The flat surfaces of the straps between the recesses and between the bottles form supports on which cracked ice is placed during the transportation of the filled case from place to place.

I claim as my invention:

1. A crate comprising side and end rails arranged one above the other edge to edge and angle reinforcing plates at the corners, one of the rails in two of the opposite walls of the crate having its middle portion cut away providing gaps for convenience in grasping the upper rails for lifting the crate and ventilating openings when the crates are placed one upon the other.

2. A crate comprising side and end rails composed of comparatively narrow slats placed edge to edge and reinforcing means at the corners thereof, one of the slats in each side and end wall having its middle portion cut away, providing gaps in the walls for convenience of inserting the hands and grasping the slat above.

3. A crate comprising side and end walls joined together at the corners, rods extending longitudinally and transversely within said crate and having their ends mounted in said walls and arranged in groups one above the other, a truss plate extending across the crate at the bottom and having an offset therein provided with holes to receive one of said rods, and hanger bars connected to said rod on each side of said offset and also connected to the corresponding rods above.

4. A crate comprising side and end walls, rods extending longitudinally and transversely within said crate, a truss bar extending across the crate at the bottom and having angled ends with holes therein to receive one of said rods, and an offset middle portion also having holes therein through which the rod passes, and means connecting said rods on each side of said offset with the corresponding rods in the crate above.

5. A container comprising side and end walls having means at the corners extending the full depth of the container for reinforcing and securing said walls together, each end wall being provided with a single elongated unobstructed opening adapted to receive the hand for convenience in handling the container and also form a ventilating gap, said openings extending longitudinally through the middle portion of the walls to points adjacent said reinforcing and securing means and through which openings air may circulate across the containers and around the contents thereof when the containers are piled one upon the other.

6. A container comprising side and end walls, and reinforcing angle plates fitting the corners of said container and having ears lapping the edges of said walls, wires passing through said walls and ears and binding them together, corner plates provided at the bottom of said container and covering and protecting the exposed portion of said wires and having ears projecting upwardly on the inner and outer faces of said corners, and means binding said ears together through said corners.

7. A crate comprising side and end walls composed of slats arranged edge to edge, reinforcing angle plates fitting the corners of said crate on the inside and outside thereof and secured together through said corners, the middle portions of some of the opposite slats being removed to form ventilating and hand-hold openings, the end portions of such slats being secured between said angle plates.

8. A crate comprising side and end walls having longitudinal handhold and ventilating gaps therein formed by removing portions of the narrow slats or rails composing said walls intermediate to their ends, said gaps extending to points near the adjacent corners of the crate.

9. A crate comprising walls having longitudinal handhold and ventilating gaps therein formed by removing portions of the narrow slats or rails composing said walls intermediate to their ends, said gaps extending through the walls of the crate to points near the adjacent corners thereof, the ends of said slats being secured in the corners and closing the gaps between the slats at that point.

10. A crate comprising side and end walls and rods extending longitudinally and transversely within said crate and mounted in said walls, a truss bar bridging the interior of said crate and provided with an offset portion having holes at each end thereof through which one of said rods passes.

11. A crate comprising side and end walls, and rods extending longitudinally and transversely within said crate and mounted within said walls, a truss bar bridging the interior of said crate and provided with an offset portion having holes therein to receive one of said rods, and hanger bars connected with said rod on each side of said offset portion.

12. A crate comprising side and end walls and rods extending longitudinally and transversely within said crate and mounted within said walls, a truss bar having an offset portion and holes in each end thereof through which one of said rods passes, said bar also having a series of holes on each side of said offset through which rods extending at right angles to said truss bar pass.

13. A crate comprising side and end walls, a truss bar having angled ends and an offset middle portion, said offset and said ends having holes therein, and a rod passing through the holes in said ends and said offset portion and secured in the opposite walls.

14. A crate comprising side and end walls, upper and lower groups of rods extending longitudinally and transversely within said crate and having their ends anchored in said walls, a truss bar having an offset middle portion, and angled ends, and having holes in said offset and in said ends through which one of said rods passes, and hangers connected at their lower ends to said rod on opposite sides of said offset, and having their upper ends connected to the upper group of rods in said crate.

15. A container comprising side and end walls and angle plates fitting the corners of the container on the inside and outside and secured together through said walls, and corner irons fitting the corners at the bottom and concealing and protecting the lower ends of said angle plates and forming shoes for contact with the floor, said corner irons extending up on the outside of the container and fitting the side and end walls, and means securing the upwardly extending portion of said irons and said angle plates together through said walls.

16. A container comprising side and end walls, a truss bar bridging the interior of said container and provided with an offset portion, and a cross member engaging said offset portion and connected to said walls.

17. A container comprising side and end walls, a truss bar bridging the interior of said container and provided with an offset portion, a cross member engaging said offset portion, and means engaging said truss bar transversely thereof and connected to opposite walls of said container.

18. A container comprising side and end walls having means at the corners for reinforcing and securing said walls together, each side and end wall being provided with a single elongated opening adapted to receive the hand and form a handhold and also a ventilating gap, said openings lying in a common plane and extending longitudinally through the middle portion of said side and end walls to points adjacent said reinforcing and securing means at the corners thereof through which openings air may circulate across the containers when they are piled one upon the other.

19. A container comprising side and end walls composed of comparatively narrow slats placed edge to edge, and reinforcing angle plates fitting the corners on the inside and outside of said container, and having ears lapping the edges of said slats, lacing wires passing vertically through said slats and ears and binding them together, corner plates provided at the bottom of said container and covering and protecting the exposed portion of said wires, and having ears projecting upwardly on the inner and outer faces of said corners, and means binding said ears together through said corners.

20. A container comprising side and end walls and angle plates fitting the corners of the container on the inside and outside and secured together through said walls, and corner irons fitting the corners at the bottom and forming shoes for contact with the floor, said corner irons extending up on the outside of the container and fitting the side and end walls, and means securing the upwardly extending portion of said irons and said angle plates together through said walls.

21. A container comprising side and end walls and angle plates fitting the corners of the container on the inside and outside and secured together through said walls and corner irons fitting the corners at the bottom and forming shoes for contact with the floor, said corner irons having upwardly extending portions lapping the lower ends of said angle plates on the inside and outside of the container and fitting the side and end walls, and means securing the upwardly extending portions of said irons and said angle plates together through said walls.

In witness whereof, I have hereunto set my hand this 23d day of July, 1921.

CHARLES A. WOOLSEY.